United States Patent [19]
Mok

[11] Patent Number: 6,078,499
[45] Date of Patent: Jun. 20, 2000

[54] SPRING LOADED HEAT PIPE CONNECTOR FOR HINGED APPARATUS PACKAGE

[75] Inventor: Lawrence Shungwei Mok, Brewster, N.Y.

[73] Assignee: International Business Machines Corporation, Armonk, N.Y.

[21] Appl. No.: 09/143,196

[22] Filed: Aug. 31, 1998

[51] Int. Cl.[7] ................................................ H05K 5/00
[52] U.S. Cl. .................. 361/687; 361/688; 361/700; 361/704; 361/707; 361/709; 174/15.2; 165/86; 165/80.2; 165/80.3; 165/80.4; 165/185
[58] Field of Search ................................. 361/687, 688, 361/700, 704, 707, 709; 174/15.2; 165/86, 80.2, 80.3, 80.4, 185

[56] References Cited

U.S. PATENT DOCUMENTS

| | | | |
|---|---|---|---|
| 5,313,362 | 5/1994 | Hatada et al. | 361/709 |
| 5,588,483 | 12/1996 | Ishida | 165/86 |
| 5,646,822 | 7/1997 | Bhatia et al. | 361/687 |

FOREIGN PATENT DOCUMENTS 272263 of 0000 Taiwan .

OTHER PUBLICATIONS

Mochizuki et al, "Hinged Heat Pipes for Cooling Notebook PC's" Thirteenth IEEE Semi–Therm Symposium, 1997, pp. 64–72.

Primary Examiner—Leo P. Picard
Assistant Examiner—Tung Minh Bui
Attorney, Agent, or Firm—Daniel P. Morris; Alvin J. Riddles

[57] ABSTRACT

An improved primary to secondary heat pipe thermal transfer connector for a hinged electronic apparatus package is achieved through the use of a thermal transfer block with a sleeve positioned on the hinge centerline of a hinged apparatus package and in a groove in the thermal transfer block. The primary heat pipe end is fused into the thermal transfer block and all secondary heat pipe ends are fused into the sleeve. The contact interface between the thermal transfer block and the sleeve is spring loaded.

14 Claims, 3 Drawing Sheets

SPRING LOADED HEAT PIPE CONNECTOR FOR HINGED APPARATUS PACKAGE

FIELD OF INVENTION

The invention relates to heat dissipation in a hinged apparatus package such as a portable computer and in particular to the enhancement of cooling capacity by transfer of heat through a hinge joining portions of the apparatus package.

BACKGROUND AND RELATION TO THE PRIOR ART

In densely packed electronic apparatus such as portable computers ever greater heat generating components are being introduced in order to enhance performance. Where the electronic apparatus is very compact it is frequently necessary to have a portion of the apparatus container hinged which adds complexity in transporting heat generated by the apparatus from one place to another place on the opposite side of the hinge. Considering the portable computer as an illustration, the packaging has evolved into the use of a case in which in a base, a keyboard is positioned adjacent to the user, and on which, on a hinged cover, a display is positioned to be facing the user, when the cover is open. The package or case is about the size of a notebook and weighs about five pounds. The capacity and performance of portable computers have been enhanced to such an extent that the thermal dissipation requirements of such apparatus has now increased from about 10 watts to 25 watts or higher. It is becoming desirable to continue to increase the thermal dissipation capability of the apparatus.

One limitation however has been the fact that the heat pipe while it is very efficient in moving heat and does not require much space, heretofore in the art, has not responded very well to the transporting of the heat through the moveable parts of a hinge in an electronics package. In many heat dissipation structures in the art there is a first or primary heat pipe that transfers heat from a relatively locallized heat source located in the main or base portion of the apparatus package, to the hinge, and then from the hinge, there is serially connected, another or secondary heat pipe that further transfers the heat to a dissipator located in the hinged portion of the apparatus package. In the use of heat pipes, for good thermal efficiency both end regions of the heat pipe should have a fused, such as soldered, heat transfer connection, and this heretofore has not been achieved in the moveable parts of an electronic apparatus hinge.

Many developments in the art heretofore have focused on reduction of thermal resistance at the rotating interface between primary and secondary heat pipe segments by freeing an end of a heat pipe from being fused so that it can rotate and then reducing thermal resistance through use of thermally conducting grease.

In U.S. Pat. No. 5,588,483 there is shown packaging technique where heat is conveyed by a heat pipe into the center of a heat conducting grease filled pipe for transfer to a metal radiating member that has an edge attached lengthwise to the pipe.

In U.S. Pat. No. 5,313,362 there is disclosed a packaging concept which incorporates various fins and other radiation structures including fins for dissipating heat through convection and includes the ultilization of extended portions of a non standard apparatus package.

In Taiwan patent publication TW272263-A there is disclosed a packaging technique in which a clamp permits a heat pipe end to revolve in the hinge.

In U.S. Pat. No. 5,646,822 there is disclosed a packaging technique wherein two heat pipe ends enter opposite ends of a common tube and rotate within it using a thermally conductive grease for lubrication and some reduction of thermal resistance.

In a publication by Mochizuki, et al., titled "Hinged Heat Pipes for Cooling Notebook PCs", Thirteenth IEEE SEMI-THERM Symposium, 1997, there is discussed an apparatus that connects two heat pipes together serially using two clamps. The apparatus however uses dry contact and clamp force to try to reduce the thermal resistance resulting from having at least one end of a heat pipe without a fused type connection.

There is a need in the art for improvement in the ability to join serial heat pipes in a moveable hinge connector that will transmit heat through the moveable region with greater efficiency.

SUMMARY OF THE INVENTION

In thermal dissipation, through a moveable hinge in electronic apparatus, an efficient connector is provided in which all ends of all heat pipe segments have fused attachment, and in which a unique moveable interface is formed between a spring urged block and a sleeve that is concentric with the hinge centerline.

An improved thermal transfer joint for a portable computer package in which there is: a primary heat pipe that has one end fused to a heat spreader at a locallized heat source such as a processor chip, and that has the other end fused into a heat transfer block; there is further provided at least one secondary heat pipe for carrying heat to a heat dissipator in the hinged portion or cover of the portable computer package; the end of each secondary heat pipe is fused into the center opening of a sleeve that in turn is concentric with the centerline of the hinge of the portable computer package; and a moveable interface is thus arranged between the outside surface of the sleeve and the heat transfer block which interface provides a large transfer area that is forced together under spring loading. In the resulting structure all heat pipe ends are fused.

DETAILED DESCRIPTION OF THE INVENTION

In the invention, in a situation where heat originating at a locallized place in one portion of an apparatus package is desired to be moved using heat pipe thermal conveyance through a hinge into another portion of the apparatus package, an efficient connector is provided in which the heat pipe thermal conveyance involves separate heat pipe segments with each end of each heat pipe being fused to a member at each side of a moveable broad area spring loaded interface.

Figure 1:
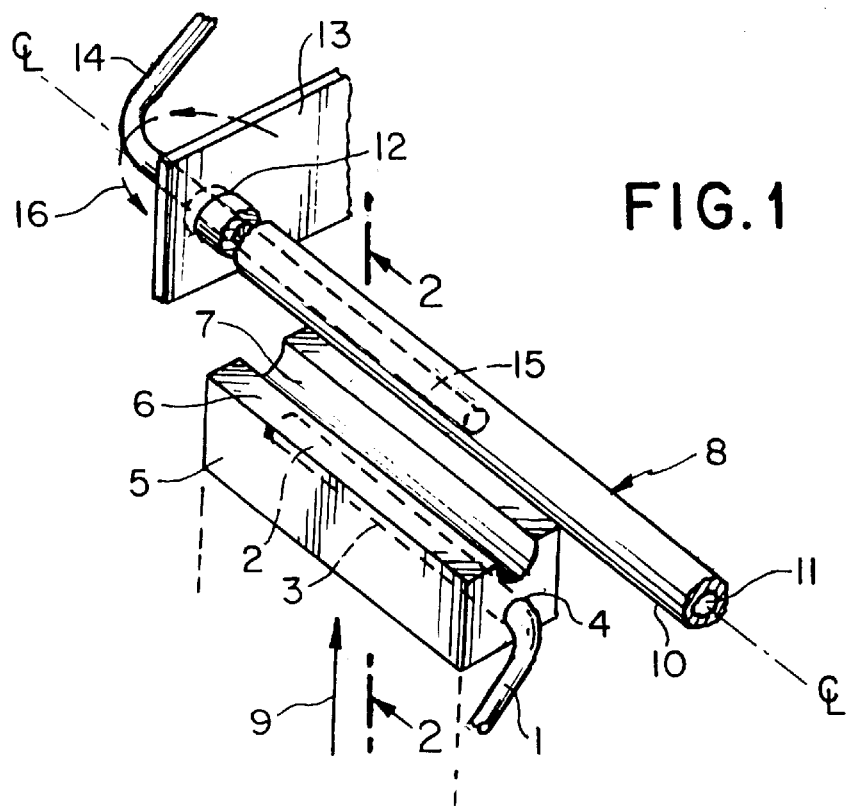
FIG. 1 is a perspective illustration of the principles involved in the spring-loaded heat pipe connector of the invention.

Referring to FIG. 1 there is shown an exploded perspective illustration of the types of elements and their interrelationship in the principles of the invention. In FIG. 1 a primary heat pipe 1 has a sealed end 2 in a fused connection 3 shown dotted inside a bore 4 in a thermal transfer block 5. The fused type of connection such as 3 is formed by providing a bore such as 4 that is slightly larger than the outside diameter of the end of the heat pipe so that a solder covered heat pipe end when inserted in the bore 4 and the solder heated to melting will fuse to the block 5 over the area of the block 5 inside the bore 4, forming thereby a broad area high thermal conductivity bond. The bore 4 in the thermal transfer block 5 is approximately parallel to the upper surface 6 of the thermal transfer block 5 and in which there is an almost parallel groove 7 in which a rotational contact sleeve 8 will rest. In this exploded view the sleeve 8 is separated from the groove 7 for illustration purposes. The thermal transfer block 5 is urged by a spring force shown as a dotted arrow 9 into contact with the outside surface 10 of the sleeve 8 in the groove 7. The sleeve 8 has a central opening 11 along it's length and is positioned along the centerline of the hinge that retains the hinged portion of the apparatus package. The sleeve 8 is retained in a position by holes through or supports attached to the hinged portion. In the perspective illustration of FIG. 1 the sleeve is illustrated as passing through an opening 12 in a portion 13 of the hinged portion or cover of the portable computer package. In this sketch only one opening 12 is shown. There will be another farther along the sleeve 8 than is shown in FIG. 1. A secondary heat pipe 14 is shown with a sealed end 15, shown dotted inserted into and making fused contact in the opening 11 in the center of the sleeve 8, so that it extends part way through the sleeve 8. It will be apparent that the end of another secondary heat pipe could if desired be placed into fused contact in the remaining portion of the opening 11 in the sleeve 8. The fused contacting areas are achieved by coating the outside of each end of each heat pipe with solder and heating the sleeve 8 with the inserted end until fusion takes place.

In the structure of FIG. 1 an interface that is rotational in the circular direction of dotted arrow 16 is formed between the groove 7 in the thermal transfer block 5 and the outside surface 10 of the sleeve 8, with those parts 7 and 10 of the interface being under spring 9 load which forces them together and reduces any thermal transfer resistance. Thus in the connector of the invention all heat pipe ends are attached by fusion and the moveable interface is achieved between the outside surface of a sleeve in a conforming groove in a surface of a thermal transfer block under a spring loaded condition.

Figure 2:
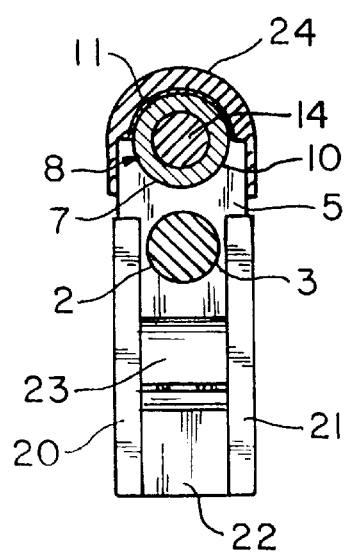
FIG. 2 is a cross sectional sketch of the spring loaded block and sleeve assembly of the heat pipe connector of the invention.

Referring to FIG. 2 there is shown a cross sectional sketch, along the vicinity of the line 2—2, of the spring loaded block and sleeve assembly of the connector of the invention. In the cross sectional sketch of FIG. 2 the secondary heat pipe 14 is fused within and to the inside surface of the opening 11 of the sleeve 8. The outside surface 10 of the sleeve 8 is in contact in the groove 7 of the block 5. The outside surface 3 of the sealed end 2 of the primary heat pipe 1 is fused at the inside surface of the bore 4 of the thermal transfer block 5. The travel of the thermal transfer block 5 is kept in alignment with a structure such as support members 20 and 21 attached to a base 22 which guide the thermal transfer block 5 and permit a spring 23 to provide the force 9 of FIG. 1, urging the outside 10 of the sleeve 8 and the groove 7 surfaces together. A lubrication may be used between the surface 10 and the groove 7 to reduce the friction and increase the heat transfer. A protective cap 24 can be added to keep unwanted particles or dust out of the interface.

Figure 3:
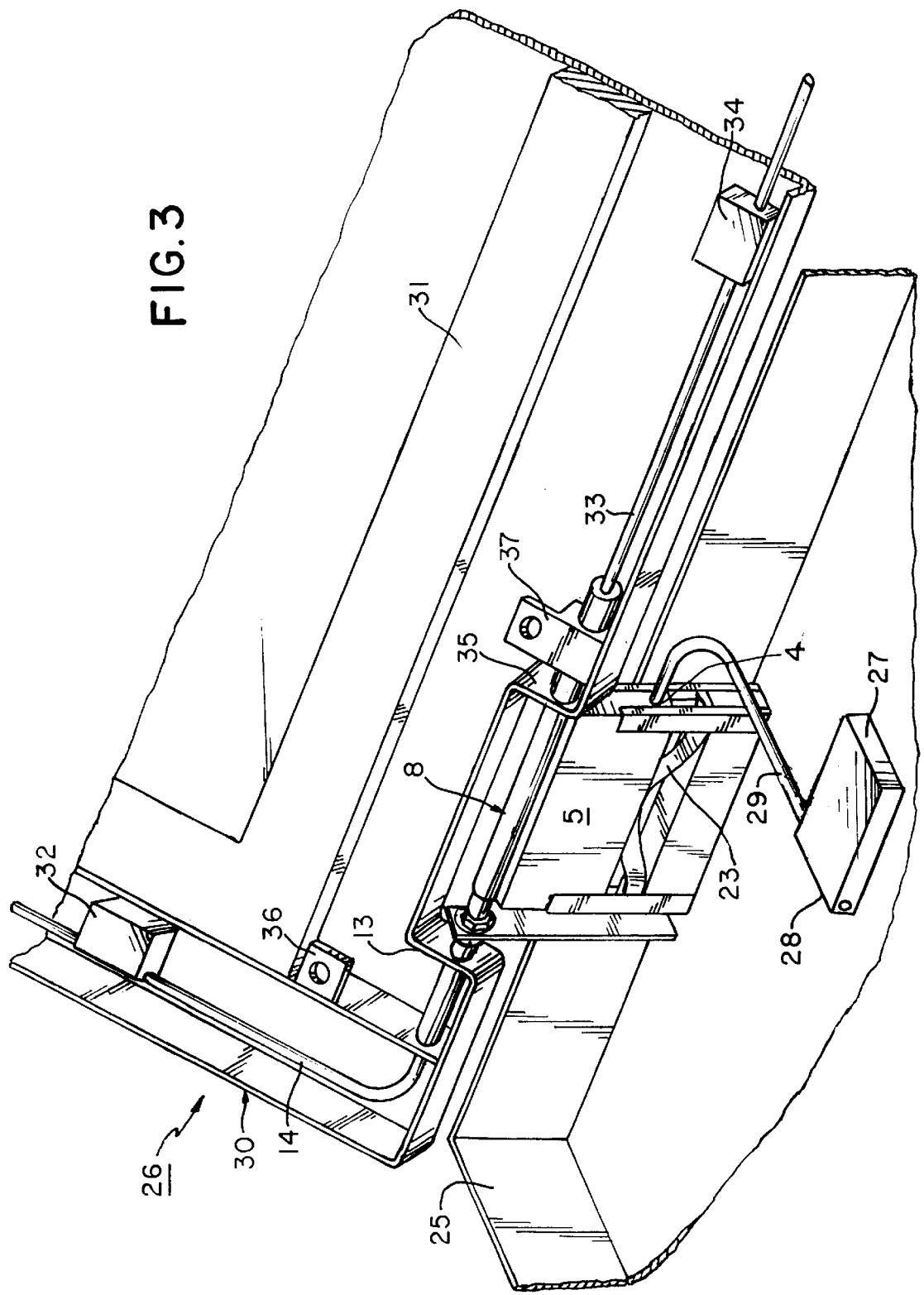
FIG. 3 is a perspective view of the heat pipe connector of the invention in place in the hinge of a portable computer package.

Referring to FIG. 3 a perspective view is provided of the invention in place in the hinge of a portable computer package, wherein like reference numerals with those of FIGS. 1 and 2 are used as appropriate, and for clarity of illustration, only the participating components are shown in the figure. As is well established in the art, heat pipes are thermal conveyance tubing members with sealed ends and which contain materials that move between portions of the heat pipe that are at different temperatures and in which those materials can change state in the transferring of the heat thereby imparting to the heat pipe an ability to move a very large quantity of heat. A major imitation of the heat pipe technology however is that the amount of energy that can be transferred at each sealed end of a heat pipe directly affects the overall efficiency of the heat pipe so that for efficiency each sealed end of the heat pipe must have the maximum efficiency thermal transfer contact that is achievable. At this state of the development of the art a broad area fused or soldered contacting area as provides the best efficiency thermal transfer available.

In a typical electronic apparatus such as a portable computer, there will be a localized source of heat such as a semiconductor chip that can serve a function such as that of a central processing unit (CPU). The localized heat source is usually placed in the main or base portion 25 of the apparatus or portable computer package 26. The CPU is conventionally placed under a heat spreader 27 and is out of view in FIG. 3. The heat generated in the CPU is transferred through a broad area fill length fused connection 28 from the heat spreader 27 to the primary heat pipe 29. The primary heat pipe 29, in turn is inserted into and fused within a bore 4 in a thermal transfer block 5 as described in connection with FIGS. 1 and 2. The thermal transfer block 5 performs the dual functions of a fused end terminus for a primary heat pipe and a portion of a moveable thermal hinge interface.

In FIG. 3 the apparatus package 26 has a hinged portion 30, such as the cover portion of a portable computer package, in which it is desirable to provide broad area heat dissipation, including the actual cover 30 itself. In portable computer standard packaging the cover 30 also contains a broad area display 31 behind which the heat dissipation structure is placed. In accordance with the invention the sleeve 8 is positioned along the centerline of a hinge around which the base 25 and cover 30 are to move with relation to each other in the package 26. The secondary heat pipe 14 is attached to the heat dissipator which in this illustration is the cover 30 by any mechanical fastening means at as many couplers 32 as desired, usually by soldering or welding to provide a good thermal transfer between the heat dissipator and the secondary heat pipe 14. There is also accommodation for a fused end of a second secondary heat pipe 33 in the remaining end of the sleeve 8 and which will transfer secondary heat pipe heat to the dissipator through as many couplers 34 as desired.

The sleeve 8 passes through and between portions such as 13 and 35 of a clearance offset of the cover 30 and is supported for, along the centerline of rotation 16 as illustrated in FIG. 1, by brackets 36 and 37 of the moveable portion of the package or cover 30. The combination of the outside surface 10 of the sleeve 8 and the groove 7 of the thermal transfer block 5 under pressure of a spring 23 provide a broad area thermally efficient mechanical hinge moveable interface that links the fused ends of the primary and secondary heat pipes. The moveable or cover and the main or lower portions of the portable computer package can thus be closed and opened like a clam shell for normal operation.

Figure 4:
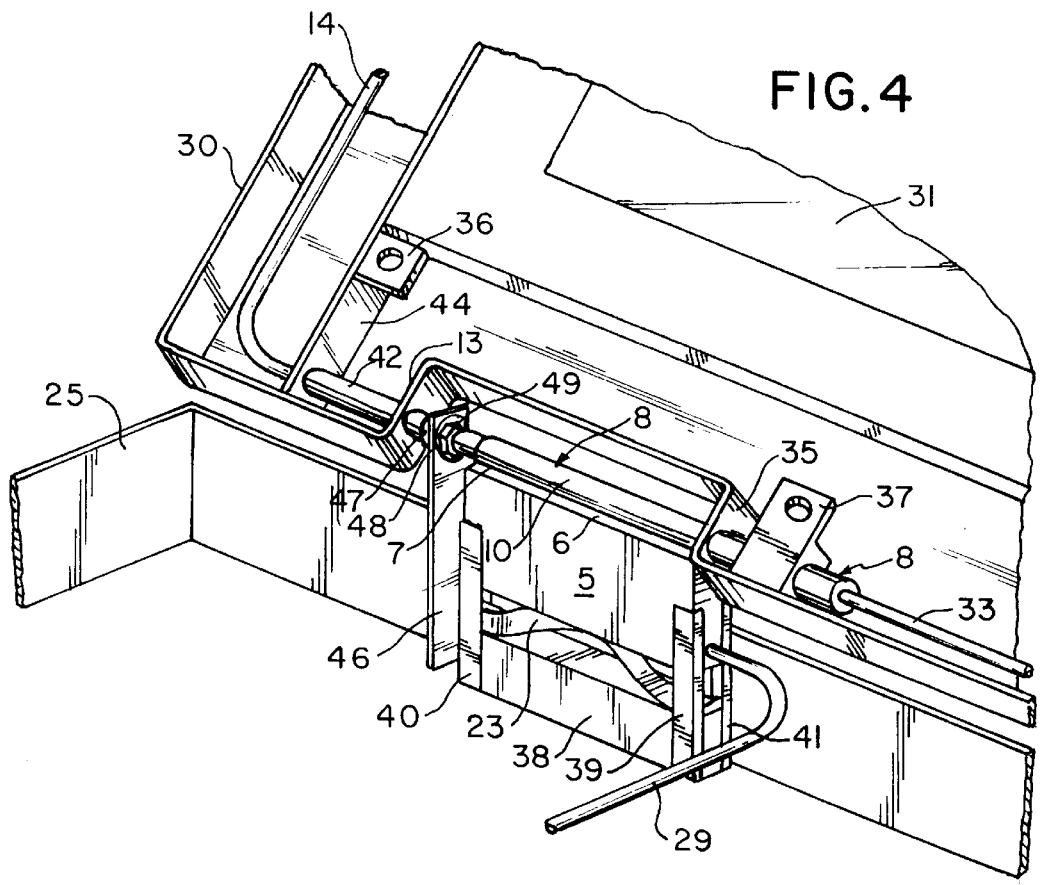
FIG. 4 is an enlarged perspective view of the heat pipe connector of the invention in place in the hinge of a portable computer package illustrating assembly details.
Figure 5:
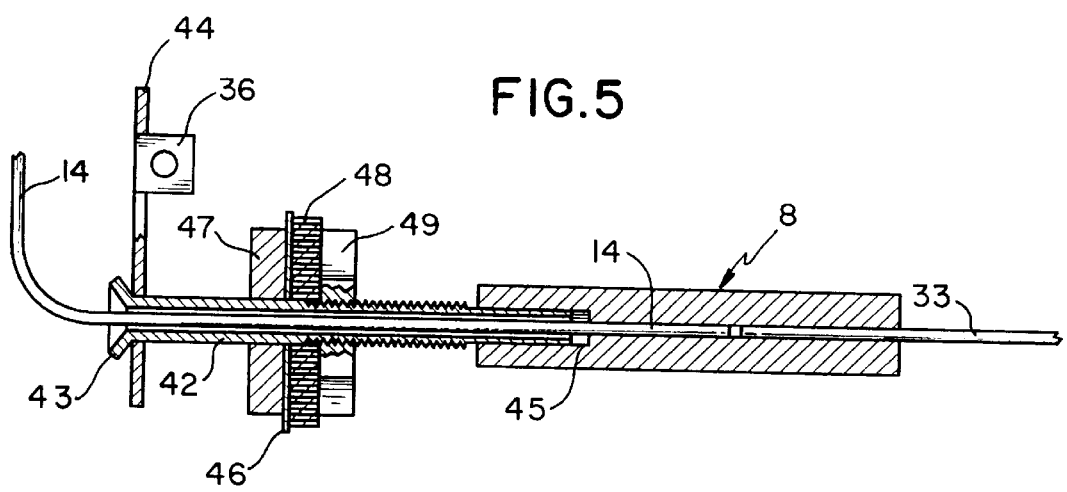
FIG. 5 is a cross sectional sketch of the relationship of the heat pipe and sleeve to the supporting portions of the package structure.

In FIGS. 4 and 5 there is shown in greater assembly detail the embodiment of FIG. 3; wherein in FIG. 4 there is an enlarged perspective view of the invention and in FIG. 5 there is a cross sectional schematic of the mounting of the sleeve mounting and travel stop features of the invention.

Referring to FIG. 4, in assembling the invention the primary heat pipe 29 is inserted into bore 4 and fused to the metal of thermal transfer block 5. The groove 7 in the face 6 on the top of the thermal transfer block 5, is forced into good thermal contact with a the outside surface 10 of sleeve 8 by a the force 9 of FIG. 1 as applied through spring 23. The two secondary heat pipes, 14 and 33, are inserted into the center opening 11 of the sleeve 8, end to end. Soldering or an equilvalent metal fusion techique is used to ensure that there be a low and minimal thermal resistance between the heat pipes and the sleeve 8. The metal thermal transfer block 5 and the spring 23 are supported by a member 38 together with four corner members of which three 39, 40 and 41 are visible in this figure, in such a way that the metal thermal transfer block 5 can move freely to provide the spring-loaded force 9 of FIG. 1 that urges the thermal transfer block 5 into contact with the outside surface 10 of cylinder 8.

The heat flow in the invention comes from a locallized source in the portion 25 of the package through the primary heat pipe 29 to and through a fused connection to the metal thermal transfer block 5. The heat travels across the broad spring loaded interface made up of the groove 7 and the outside surface 10 of the sleeve 8, then into the secondary heat pipes 14 and 33, then via couplers such as 32 and 34 to being dissipated in connection with the cover 30.

Referring to FIGS. 4 and 5 together, the brackets 36 and 37 serve the function of one arm of the rotational capability or hinge and fasten the sleeve 8 in alignment along the hinge centerline to a bezel that surrounds the display 31 and is attached to the cover or hinged portion 30. The bezel is not shown as it would obscure the view of the other parts in the figure. In FIG. 5 a cross sectional depiction of the structure is shown. A tube member 42 having a shoulder 43 passes through an extension 44 of the bracket 36 and supports an end of the sleeve 8 in a counterbore 45. in the sleeve 8. The tube member 42 is usually made of a structural material such as steel. The secondary heat pipe 14 passes through the tube member 42 into and is fused in the sleeve 8. A brace member 46 is fastened to the portion 25 of the package and serves the function of the other arm of the rotational capability or hinge. The brace member 46 is locked between a stopper 47 on the tube member 42 and a disk spring member 48 with a nut 49. The disk spring member 48 is a spiral spring in a housing that urges the tube member 42 to rotate in the dirction of arrow 16 in FIG. 1. With this structure the rotational torque of the hinge, produced by the arrow 16, can be adjusted by tightening or loosening the nut 49.

What has been described is an improved primary to secondary heat pipe thermal transfer connector for a hinged electronic apparatus package having a thermal transfer block with a sleeve positioned on the hinge centerline in a groove in the thermal transfer block. All heat pipe ends have fused connections and the contact interface between the thermal transfer block and the sleeve is spring loaded. The primary heat pipe end is fused into the thermal transfer block and all secondary heat pipe ends are fused into the sleeve.

What is claimed is:

1. A heat pipe connector for moveable thermal transfer between primary and secondary heat pipe segments in a hinged apparatus package,
   comprising in combination:
   a sleeve member having an outside surface and a central inside opening,
     said sleeve member being positioned with said central inside opening aligned along the centerline of the hinge of said apparatus package,
   a thermal transfer block having a groove on a first surface thereof
     said groove having accommodation dimensions for said outside surface of said sleeve member,
     said thermal transfer block having a heat pipe end accommodating bore in the material of said block that is approximately parallel to said groove,
   force means adapted to apply pressure to said block and operable to force said groove and said outside of said sleeve in contact each other,
   an end of a primary heat pipe having a fused connection to said block inside said bore, and,
   at least one end of at least one secondary heat pipe having a fused connection to said sleve inside said inside opening.

2. The heat pipe connector of claim 1 wherein said force means is a spring.

3. The heat pipe connector of claim 1 wherein said force means is applied to a surface of said block that is parallel to said groove.

4. The heat pipe connector of claim 1 wherein said at least one secondary heat pipe is a secondary heat pipe end in fused contact inside said inside opening in each end of said sleeve.

5. In heat dissipation in an electronic apparatus package wherein heat is generated in a first portion of said package that is to be dissipated in a second portion of said package that is attached to said first portion through a hinge,
   a thermal transfer structure comprising:
   a primary heat pipe having a first end attached by fusion to a source of heat in a said first portion of said package,
   at least one secondary heat pipe each having a first end attached by fusion to a heat dissipator member in said second portion of said package,
   a sleeve member having an outside surface and a central inside opening,
     said sleeve member being positioned with said central inside opening aligned along the centerline of said hinge,
   a thermal transfer block having a groove on a first surface thereof,
     said groove having accommodation dimensions for said outside surface of said sleeve member,
     said thermal transfer block having a heat pipe end accommodating bore in the material of said block that is approximately parallel to said groove,
   force means adapted to apply pressure to said block and operable to force said groove and said outside of said sleeve in contact each other,
   a second end of said primary heat pipe having a fused connection to said block inside said bore, and,
   at least one second end of said at least one secondary heat pipe having a fused connection to said sleeve inside said inside opening.

6. The heat pipe connector of claim 5 wherein said force means is a spring.

7. The heat pipe connector of claim 6 wherein said force means is applied to a surface of said block that is parallel to said groove.

8. The heat pipe connector of claim 5 wherein said at least one second end of at least one secondary heat pipe includes first and second secondary heat pipe ends positioned in fused contact inside said inside opening in each end of said sleeve.

9. A thermal transfer structure between a locallized heat source located in the base of a portable computer package and a heat dissipation element located in a hinged cover of said portable computer package, comprising:

a sleeve member having an outside surface and a central inside opening,
said sleeve member being positioned with said central inside opening aligned along the centerline of the hinge of said portable computer package, a thermal transfer block having a groove on a first surface thereof
said groove having accommodation dimensions for said outside surface of said sleeve member,
said thermal transfer block having a heat pipe end accommodating bore in the material of said block that is approximately parallel to said groove, force means adapted to apply pressure to said block and operable to force said groove and said outside of said sleeve toward each other, a primary heat pipe having a first end with a fused connection to said localized heat source and with the remaining second end thereof having a fused contact to said block inside said bore, and, at least one secondary heat pipe each having at least one first end in a fused connection inside said inside opening of said sleeve and having the remaining end thereof in fused connection to said heat dissipator.

10. The portable computer thermal transfer structure of claim 9 wherein said locallized heat source is the central processing unit of said computer.

11. The portable computer thermal transfer structure of claim 10 wherein said force means is a spring.

12. The portable computer thermal transfer structure of claim 11 wherein said spring is applied to a surface of said block that is parallel to said groove.

13. The portable computer thermal transfer structure of claim 12 wherein there is a secondary heat pipe end in fused contact inside said inside opening in each end of said sleeve.

14. An apparatus for transferring the heat acrossed the hinged cover of a portable computer comprising:

a primary heat pipe having a first end attached by fusion to a heat spreader on said central processing unit in said base of said portable computer, at least one secondary heat pipe each having a first end attached by fusion to a heat dissipator member in said cover of said portable computer, a sleeve member having an outside surface and a central inside opening,
said sleeve member being positioned with said central inside opening aligned along the centerline of said hinge of said cover, a thermal transfer block having a groove on a first surface thereof,
said groove having accommodation dimensions for said outside surface of said sleeve member,
said thermal transfer block having a heat pipe end accommodating bore in the material of said block that is approximately parallel to said groove, force means adapted to apply pressure to said block and operable to force said groove and said outside of said sleeve toward each other, the second and remaining end of said primary heat pipe being attached by fusion in said bore in said block, and, each second and remaining end of each said secondary heat pipe being attached by fusion inside said inside opening at an end of said sleeve.

* * * * *